United States Patent [19]
Brady et al.

[11] Patent Number: 5,914,938
[45] Date of Patent: Jun. 22, 1999

[54] MAC ADDRESS TABLE SEARCH UNIT

[75] Inventors: David M. Brady, Cupertino; David A. Head, Fremont; Suryanarayan Ramamurthy; Ahmad Esmaeili, both of Mountain View, all of Calif.

[73] Assignee: Bay Networks, Inc., Santa Clara, Calif.

[21] Appl. No.: 08/746,963

[22] Filed: Nov. 19, 1996

[51] Int. Cl.$^6$ ........................................................ H04J 3/02
[52] U.S. Cl. ............................................ 370/254; 370/401
[58] Field of Search ................................... 370/254, 400, 370/401, 398, 474, 472, 471, 470, 351, 352; 707/10, 7, 8, 9, 100, 205, 103, 3; 701/110, 118, 120, 122, 143

[56] References Cited

U.S. PATENT DOCUMENTS 5,664,184  9/1997  Ferguson et al. ........................ 395/614
5,799,305  8/1998  Bortvedt et al. .......................... 707/10

Primary Examiner—Dang Ton
Attorney, Agent, or Firm—Blakely Sokoloff Taylor & Zafman LLP

[57] ABSTRACT

A search key having a first length is presented to a universal hashing process. The search key is hashed using a universal hash function to generate a bucket ID having a second length, smaller than the first length. The bucket ID is used to address a table stored in a computer readable medium and a pointer is retrieved from an associated storage location. The pointer is used to index a hash bucket containing one or more entries, each of which can be compared to the search key to determine whether any of the entries match the search key. For the case where the method is used in a Ethernet switch, the search key may comprise a virtual LAN identification and media access control address. The table is made up of number of hash buckets, each of which may have one or more entries. New entries are stored in one of the hash buckets according to the universal hash function so long as no overflows of any hash bucket would be created. If a bucket overflow would result from the storing operation, a new hash function is automatically selected so that no hash bucket overflows will result when the new entry is stored in a new table.

13 Claims, 5 Drawing Sheets

| Segment | 1 | 2 | 3 | 4 | 5 | 6 | 7 | 8 |
|---|---|---|---|---|---|---|---|---|
| 64-bit Search Key | 8 bits | 8 | 8 | 8 | 8 | 8 | 8 | 8 |
|  | * | * | * | * | * | * | * | * |
| 136-bit Hash Coef. | 17 bits | 17 | 17 | 17 | 17 | 17 | 17 | 17 |
|  | = | = | = | = | = | = | = | = |
| Sum the Products | P1 + | P2 + | P3 + | P4 + | P5 + | P6 + | P7 + | P8 = SUM |

$(Sum)\ MOD\ (2^{17} - 1) = Bucket\ ID$

Fig. 4

MAC ADDRESS TABLE SEARCH UNIT

FIELD OF THE INVENTION

The present invention relates generally to computer networks and, more particularly, to a method and apparatus for maintaining a forwarding table in a switching node of a computer network.

BACKGROUND

In recent years, local area networks (LANs) have become a common place in offices and other environments. Now, virtual LANs are beginning to emerge as well. In a basic sense, a switched virtual LAN is a broadcast domain that unites any arbitrary group of LAN segments at wire speed. As is the case with a single physical wire, broadcasts travel to all end-stations in a virtual LAN. A single virtual LAN can connect dozens, or in some cases hundreds, of LAN users. The ability to include multiple physical LAN segments gives virtual LANs a distinct advantage of multiple port routers. In a effort to gain bandwidth for LAN users, network managers often deploy conventional multiple port routers to segment LANs, but each physical segment created by a multiple port router must be treated as a separate logical sub-net. Traffic passing between sub-nets is subjected to additional delay because of processing by the routers.

Virtual LANs minimize this delay problem because they bridge, rather than route, traffic destined for different segments within the same network. Multiple segments per sub-net generally means fewer routing bottlenecks. It also means that end-stations can be assigned to different virtual LANs without having to reconfigure the physical network.

When virtual LANs are used to sub-divide switched traffic into contained areas, Ethernet switching becomes a powerful inter-networking method that greatly reduces the role of the router. Each defined virtual LAN can include several physical segments per local sub-net. With virtual LANs, a network administrator can define user groups regardless of the physical LAN segment to which they are connected. Users assigned to the same virtual LAN communicate at wire speed with low latency and, generally, no routing bottlenecks, regardless of their physical location in the network. Virtual LANs can be extended across multiple switches, with the switches being linked by high speed backbones, such as FDDI, 100 MBPS fast Ethernet, or ATM. Some switches may handle virtual LANs at the data link level (i.e., layer two of the OSI model), leaving layer three (network layer) functions to routers. Other switches may handle virtual LANs at layer three, meaning that they perform basic routing chores themselves.

Ethernet virtual LANs that function at layer two are often defined by software that allows network administrators to group a number switched ports together into a high bandwidth, low latency switched work group. Under the layer two approach, each virtual LAN is assigned a unique number that identifies it for network management purposes. These layer two virtual LANs are based on bridge architecture's that transmit data using media access control (MAC) source and destination addresses. Traffic within virtual LANs is switched according to these addresses and traffic between virtual LANs is handled by a router that imposes filtering, security and traffic management. The router can be either a stand alone unit or a separate card integrated into an Ethernet switch. Either way, the routing is handle by software which is separate from the virtual LAN switching logic.

Once layer two port group virtual LANs are defined, each switch of the network reads incoming frames and learns the MAC addresses associated with each virtual LAN. If an end station sends broadcast or multicast frames, those frames are then forwarded to all ports in that end station's virtual LAN. The ports can be spread across any number of switches connected to the high speed backbone. All LAN segments in a port group are bridged together whether they are separated by the backbone or reside in the same switch.

Supporting layer two virtual LAN port groups on a single switch is a straight forward process. Ethernet switches cache MAC addresses and information about which port each MAC address is connected to. With virtual LAN switches, a virtual LAN number is added to a MAC address and stored in the switch's forwarding table. Armed with this information, switches can direct broadcast to the appropriate ports.

In order to provide rapid access to the forwarding tables, some Ethernet switches use a storage system based on hashing. Hashing is a storage system based on the antithesis of sorting. Instead of keeping the data in an orderly pattern, hashing staggers records throughout a storage space in a pseudorandom function. This pseudorandom function uses the value of a record's key as a search key and outputs an address within the storage space that the data can be placed in. The storage space address is often referred to as a storage bucket.

The function used to generate array indices from search keys is called a hash function and the resulting array is generally referred to as a hash table. Unfortunately, generating appropriate array indices from keys often proves to be difficult. The reason is that if the keys for two different data records hash to the same index value, then collisions will occur. Collisions pose a problem because, over the course of time, the switch will be required to locate stored data records and, if two records have been hashed to the same location in a hash table, one may overwrite the other, resulting in a loss of information. Several techniques for resolving collision problems have been used in the past.

For example, a bounded bucket size approach, where bucket size is limited to a value less than the total number of items being stored in the table, has been used. The benefit of this approach is a guarantee on the maximum search time required to search the table. The consequent problem with such a scheme, however, is the inability of the designer to guarantee storage of all items in the table.

Unbounded bucket size approaches where all items could be stored in one bucket if the selected hash function produced such a result, have also been employed. While such schemes ensure that all items can be stored, search times cannot be guaranteed because the bucket size will vary.

Accordingly, it would be desirable to have an Ethernet switch capable of allowing a guaranteed search time (which is less than the search time required for an unbounded bucket scheme) for each MAC address presented and a guarantee as to the number of entries which can be stored in the MAC address forwarding table.

SUMMARY OF THE INVENTION

In one embodiment, the present invention provides a method of locating an entry in a table stored in a computer readable medium. A search key having a first length is presented to a search process. This search value is hashed to generate a bucket identifier having a second length, smaller than the first length. The bucket identifier is then used to address a table stored in a computer readable medium and a pointer is retrieved from an associated storage location. The pointer is used to index a hash bucket containing one or more entries, each of which can be compared to the search key to determine whether any of the entries match the search key. For the case where the table locating method is used in an Ethernet switch, the search keys comprise a virtual LAN identification and media access control address.

In this embodiment, the hash function applied to the search key first segments the search key into a number of equal segments. Each of the segments is multiplied by a corresponding segment of a hash coefficient to create a series of products. These products are summed and the resulting sum is then subjected to a MOD operation with a prime number. The result of the MOD operation is used as the bucket identifier to address the table.

In another embodiment, the present invention provides a computer assisted method of configuring a media access control (MAC) address table for a switching node of a communication network. The MAC address table is made up of a number of hash buckets, each of which have one or more entries. As frames are received at the switching node, a MAC address is identified and, if not already present within the MAC address table, stored as a new entry in one of the hash buckets according to a hash function so long as no overflow of any hash bucket would be created. If a bucket overflow would result from the storing operation, a new hash function is automatically selected so that no hash bucket overflows will result when the new MAC address is stored in a new MAC address table.

BRIEF DESCRIPTION OF THE DRAWINGS

The present invention is illustrated by way of example and not limitation in the figures of the accompanying drawings in which like numeral indicate similar elements and in which:

FIG. 4 is a graphical illustration of a hashing process according to the methods of the present invention.

DETAILED DESCRIPTION

A MAC address table search unit is described. In alternative embodiments, the present invention may be applicable to implementations in integrated circuits or chip sets, wireless implementations, switching systems products and transmission system products. For purposes of this application, the term switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access multiplexers, and associated signaling and support systems and services. The term transmission system products shall be taken to mean products used by services providers to provide interconnection between their subscribers and their networks, such as loop systems, and which provide multiplexing, aggregation and transport between the service provider's switching systems, and associated signaling and support systems and services.

Figure 1:
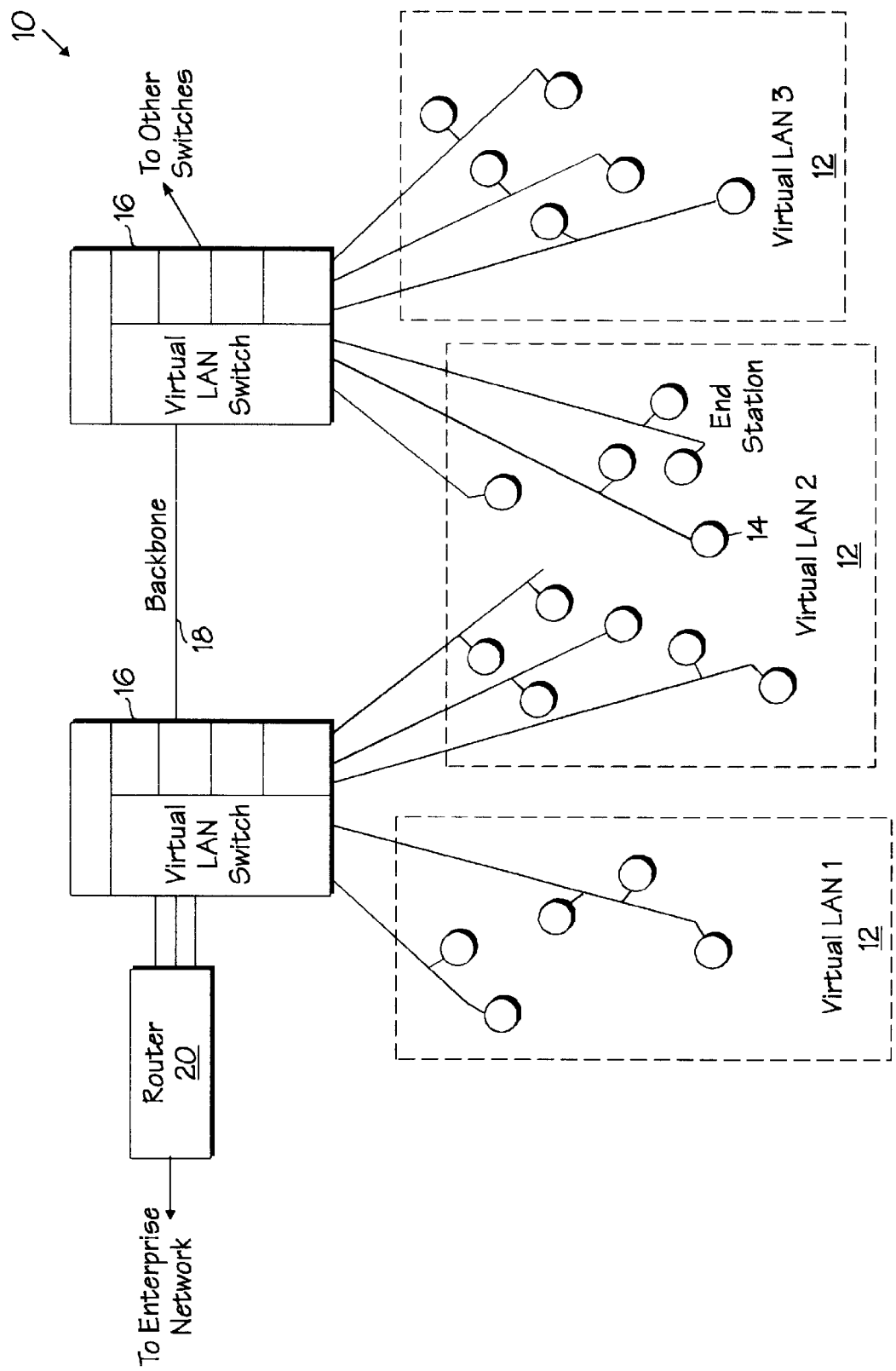
FIG. 1 illustrates a computer network utilizing the methods of the present invention and made up of a number of virtual LANs.

FIG. 1 illustrates a computer system 10 which is made up of a number of virtual LANs 12. Each virtual LAN 12 has a number of end-stations 14. For clarity, only one end-station 14 is labeled in FIG. 1, however, it will be appreciated that each of the end-stations is substantially similar. The end-stations 14 are connected via virtual LAN switches 16. The virtual LAN switches 16 are coupled via a high speed backbone 18. As shown, each of the virtual LAN switches 16 may be connected to other switches within computer system 10 or a virtual LAN switch 16 may be connected to a router 20 which itself is connected to other enterprise networks.

The virtual LAN switches 16 shown in FIG. 1 may create the various virtual LANs 12 at the data link layer (i.e., layer two of the OSI model), leaving layer 3 (i.e., network layer) functions to routers. Alternatively, the virtual LAN switches 16 may handle the virtual LANs 12 at layer 3, and thereby perform basic routing chores.

Figure 2:
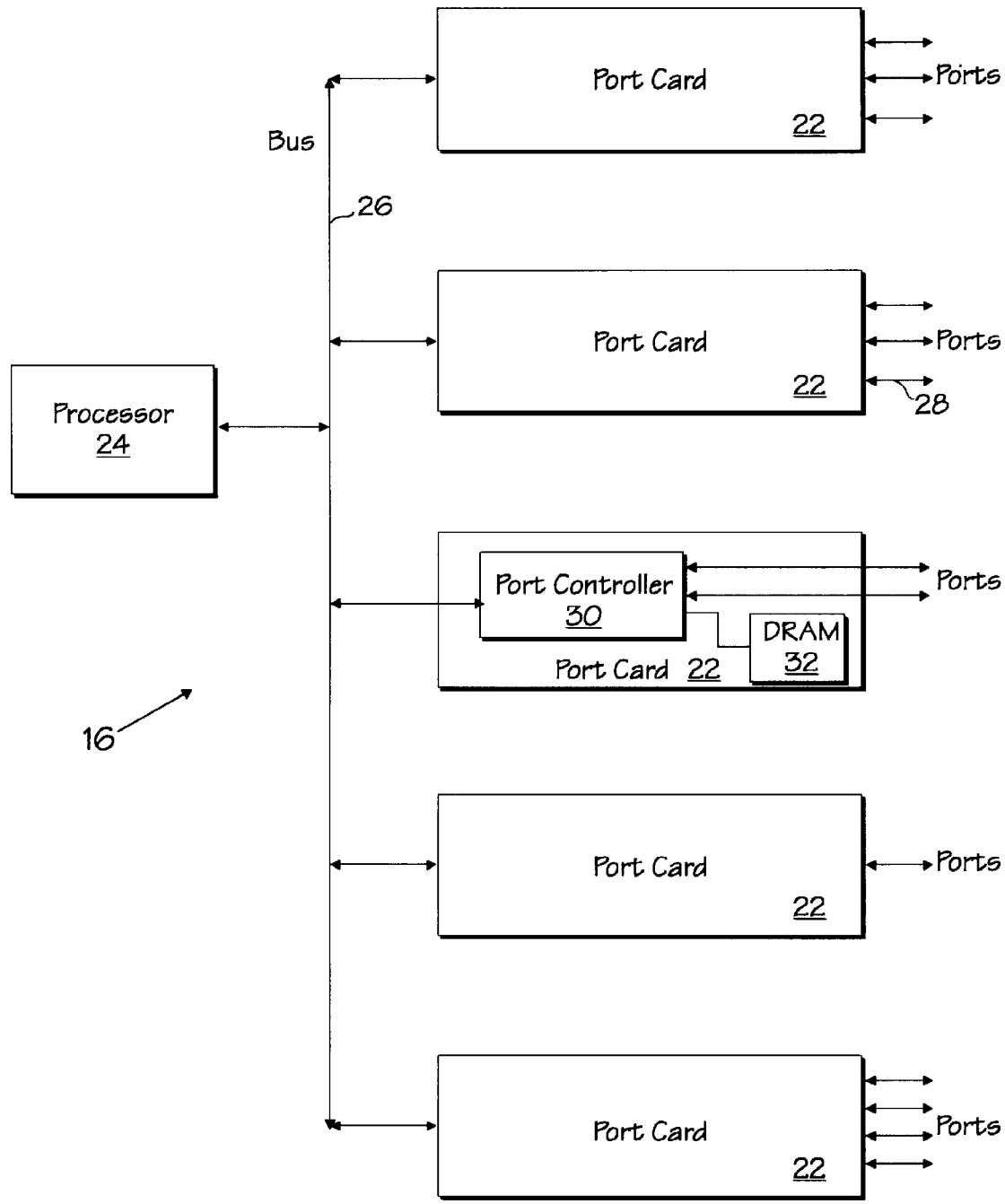
FIG. 2 illustrates a network switch node of the computer network shown in FIG. 1.

FIG. 2 further illustrates a virtual LAN switch 16. Each switch 16 includes a number of port cards 22 and a central processor 24. The central processor 24 communicates with each of the port cards 22 via a system bus 26. Each of the port cards 22 supports a number of ports 28. Those skilled in the art will appreciate that each of the ports 28 may handle traffic from a number of end-stations 14 within each of the virtual LANs 12.

As illustrated, each port card 22 includes a port controller 30 and an associated storage device 32. In a preferred embodiment, each port 28 has a dedicated port controller 30 and storage device 32, however, those skilled in the art will appreciate that other configurations may allow a single port controller 30 and storage device 32 to be associated with multiple ports. In one embodiment, the storage device 32 may be a DRAM.

Each port card 22 caches address and other information about each port 28 connected thereto. It will be appreciated that this information may be stored locally in storage devices 32 or, in some cases, may be stored in a central storage device accessable by multiple port controllers 30 via system bus 26. As frames of information are received across ports 28, port controller 30 examines address information within each of frames and compares that information to address information stored in a forwarding table stored in DRAM 32. Based on this comparison, the port controller 30 can determine which port (if any) the incoming frame needs to be switched to and may then pass the frame to the appropriate port card 22 across system bus 26. In some cases, port controller 30 will recognize that the frame is destined for an end-station 14 associated with the port 28 which the port controller 30 controls. In this case, the frame is not forwarded.

As indicated, each frame of information transmitted across computer network 10 contains address and other information. Those skilled in the art will appreciate that a typical Ethernet frame includes a destination address (DA), a source address (SA) and a data field (DATA). The destination address and source address are each 6 bytes (48 bits) long. The DATA is the actual payload being transmitted within the frame. It's length will vary depending upon the associated application. Some Ethernet frames include an additional header portion which specifies a virtual LAN identifier (VLAN ID) which is two bytes (16 bits) in length. Together, the VLAN ID and destination address (DA) uniquely identify an end-station 14 which is to receive a frame.

Figure 3:
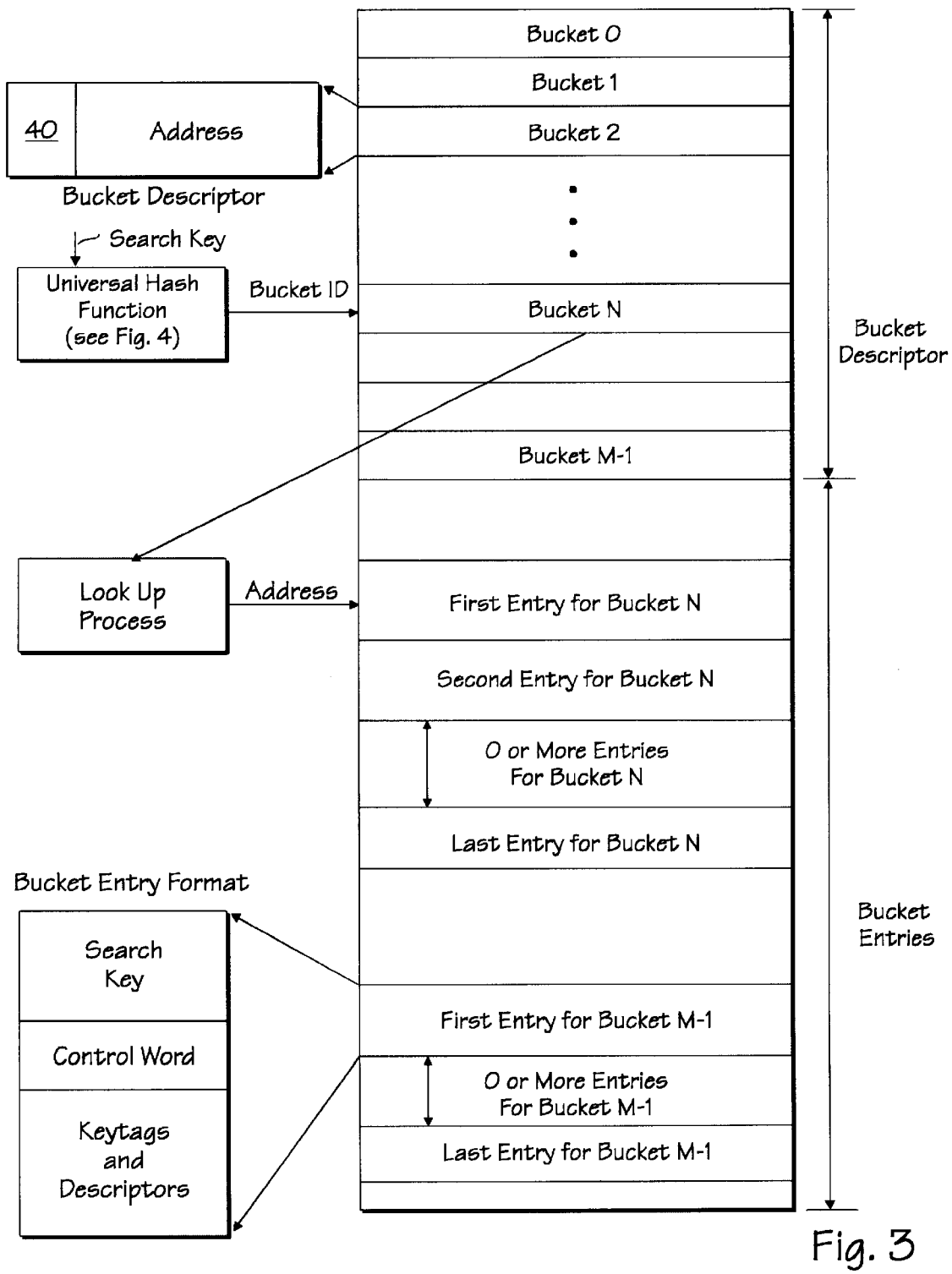
FIG. 3 is a graphical illustration of the structure of a MAC address table according to one embodiment.

When a frame having a VLAN ID and a destination address (DA) is received at port controller 30, the port controller 30 can compare the VLAN ID and destination address with those stored in it's forwarding table in order to determine the appropriate routing within switch 16 for the received frame. FIG. 3 further illustrates the manner in which this process is accomplished. As illustrated, DRAM 32 contains a forwarding table which includes a bucket descriptor portion and bucket entry portion. Those skilled in the art will appreciate that the forwarding table has been organized as a hash table. The bucket descriptor portion of the forwarding table contains buckets O to M-1 and the bucket entry portion of the table contains corresponding entries for each of buckets O to M-1 which contain entries. Each bucket O to M-1 may have one or more entries.

An exemplary format of each bucket entry is illustrated in FIG. 3. In general, each bucket entry contains information which corresponds to a port address for the switch 16. Once the appropriate bucket entry has been located, the VLAN ID and destination address search value can be compared with that stored in the bucket entry and, if the two match, the corresponding port routing information can then be used by switch 16 to route the Ethernet frame appropriately.

As further illustrated in FIG. 3, each of the bucket descriptors contain address information. The address information is used as a pointer in order to index the corresponding bucket entries for each of the buckets. The first bit 40 of each of the bucket tables may be used as an empty flag to indicate whether any bucket entries exist for the corresponding bucket. If bucket entries do exist, a 1 may be placed in the first bit position 40. If no bucket entries exist, i.e., indicating a empty bucket, a 0 may be placed in first bit position 40.

As shown in FIG. 3, a search key, made up of the VLAN ID and the destination address retrieved from a received frame, is applied to a universal hash function. Note that for a single VLAN implementation, the VLAN ID may be obtained from processor 24 (which would write a VLAN ID to an appropriate register within port controller 30) rather than from a received frame. Alternatively, a VLAN ID may be obtained from protocol information associated with a received frame or from a VLAN ID header within the received frame itself. The output of the hashing process is a bucket ID value which is used to locate the appropriate bucket descriptor N in the bucket table. From the bucket N, address information is obtained which then can be used by a look-up process to index the appropriate bucket entries for bucket N. Each of the bucket entries corresponding to bucket N can then be compared with the original search key (i.e., the VLAN ID and the destination address) in order to determine whether a match exists. If a match exists, the Ethernet frame corresponding to the search key is routed according to the information contained in the bucket entry.

In addition to DA lookups, SA lookups may also be performed when a frame is received. Such operations allow the hash table to be updated with new values for new end-stations within a network. The SA lookups are performed in the same fashion as the DA lookups described above, except that the search key will be made up of an SA and VLAN ID. If the SA does not correspond to any existing bucket entry in the table, it is added as a new entry using the techniques described below.

The hashing process used with the above described method is further illustrated in FIG. 4. As shown, the 64-bit search value (i.e., the VLAN ID and destination address) is divided into eight segments, each 8 bits in length. Each one of these segments is multiplied by a corresponding 17-bit segment of a 136-bit hash coefficient. The hash coefficient is generated by the central processor 24 of switch 16 and supplied to each of the port controllers 30. The manner in which these hash coefficients are selected is discussed further below. Each one of the products P1–P8 which result from the above multiplication step are then added together to produce a sum. The sum then undergoes a MOD operation in which the divisor is a prime number M, where M equals the number of buckets, in order to produce the bucket ID. If the divisor M is selected to be of the form $M=2^P-1$, where P is an integer and M is a prime number, those skilled in the art will recognize that the MOD circuit may be designed to avoid a divide operation. Instead, as recognized by J. Lawrence Carter and Mark N. Wegmen in "Universal Classes of Hash Functions," 18 *Journal of Computer and System Sciences*, pp. 143–154 (1979), only one multiply and a few addition, shift and Boolean operations will be required. This may result in increased speed and a fewer number of gates if the above operation is performed in hardware.

The selections of the hash coefficient and the prime number divisor for the MOD operation are governed by the criteria that in one embodiment, a maximum of four compare operations per bucket should be performed when 8K entries are stored in the hash table. That is, after a search key is hashed and a bucket is identified, no more than four buckets entries should exist for each individual bucket in the bucket table. This guarantees that a maximum of four compare operations will need to be performed for each Ethernet frame received over computer network 10. To achieve this result, P is selected so that P=17. It will be appreciated that because the number of buckets $M=2^{17}=$ 128K, a total of 8K items may be stored in the hash table with this embodiment, and the vast majority of the $2^{136}$ hash functions implemented by the hash algorithm shown in FIG. 4 (where a single hash function is selected by selecting a single value for the Hash Coefficient) will not produce an overflow in the hash table, regardless of the values of the 8K entries. Those skilled in the art will recognize that limiting the number of compare operations in this fashion necessarily allows the switch designer to guarantee a worst-case search time.

Figure 5:
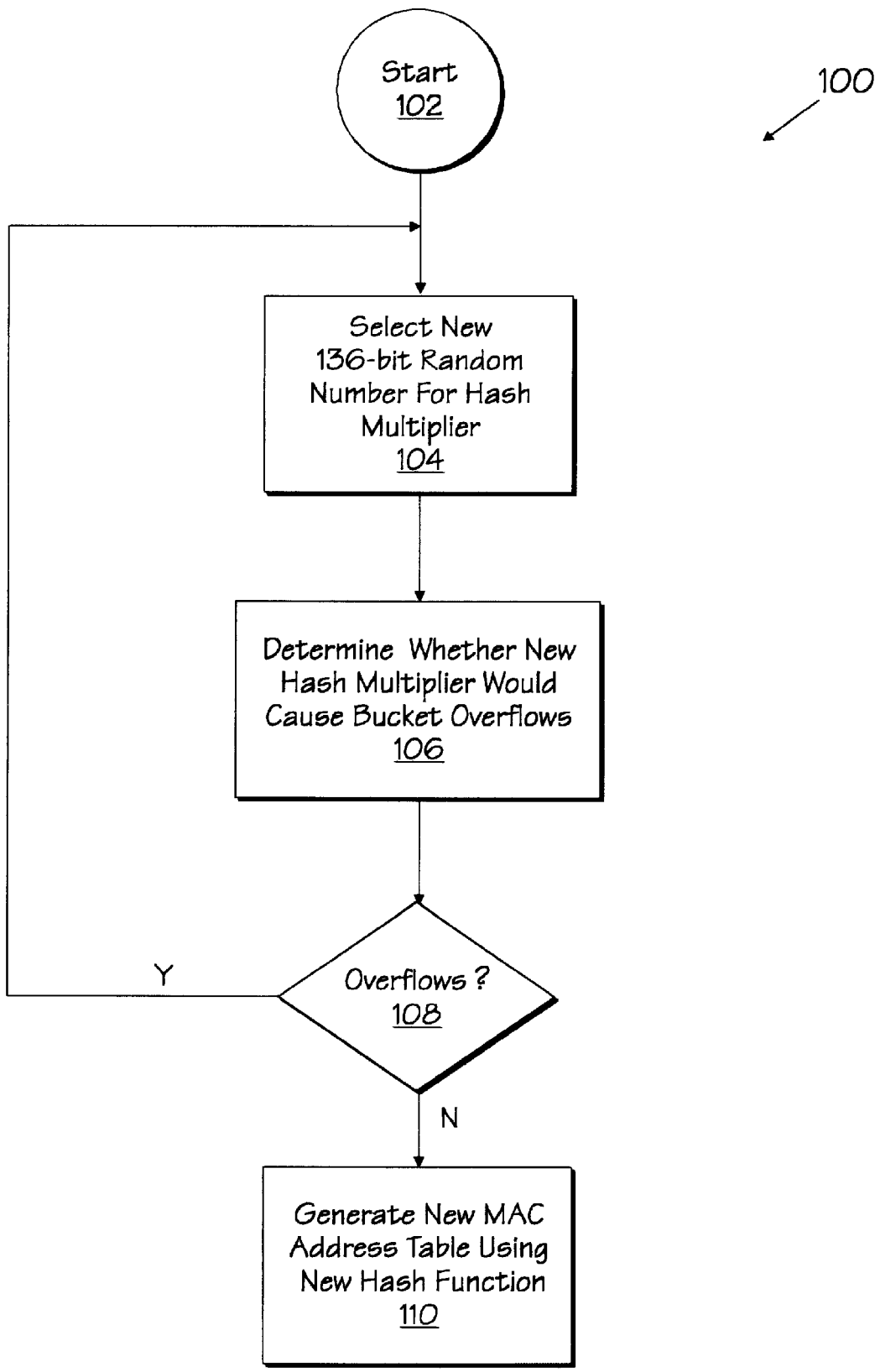
FIG. 5 is a flow diagram illustrating the process of selecting a new hash function in accordance with the present invention.

To guarantee this criteria, a universal hashing algorithm is used to compute the bucket identifier. This process is illustrated in FIG. 4. Assume that the forwarding table of FIG. 3 is configured to hold 8k entries and that close to this number of entries are currently stored in the table. If a new address and VLAN ID combination is received (and, hence, needs to be stored), a bucket overflow may occur. That is, when the destination address and VLAN ID combination are hashed, they may hash to a bucket which already has four associated bucket entries. In such a case, the switch 16 must change to another hash function, and in particular, a hash function which does not produce a overflow. The manner in which the change is performed is illustrated in FIG. 5.

The selection process 100 begins at step 102 when a potential overflow is recognized. This may correspond to a condition where any hash bucket contains 3 or more entries or another user defined condition. Processor 24 may keep track of such information and update the hash coefficient as appropriate. Then at step 104, the system processor 24 randomly selects a new hash multiplier value but does not yet write that new value to the port controllers 30. Instead, the processor 24 first determines, at step 106, whether the new hash function will produce a potential bucket overflow condition or other conditions necessitating that a new hash function be selected. This is performed by calculating the hash result for each of the addresses that need to be stored in the forwarding table. At step 108, the processor 24 determines whether any potential overflow conditions occurred. If so, the processor 24 repeatedly selects new hash multiplier values until it identifies a good hash function (i.e., one which does not produce potential bucket overflows). Since the probability of a random hash function not producing a bucket overflow is approximately one thousand to one for 8K entries stored in 128K buckets of maximum size 4 (Binomial Distribution), typically the first value chosen will yield a good hash function.

When a new hash function which does not cause any bucket overflows is identified, process 100 moves to step 110 where a new forwarding table is generated using the new hash function. As part of this step, the newly received VLAN ID and address combination are stored as a new bucket entry.

Accordingly, a new MAC address table search unit has been described. Those skilled in the art will appreciate that the present invention has been described with reference to particular embodiments thereof. However, the details of these embodiments may not be required to implement the features of the present invention. Accordingly, the specification and drawings are to be regarded as illustrative only and the present invention is to be limited only in terms of the claims which follow.

What is claimed is:

1. A computer assisted method of locating an entry in a table stored in a computer readable medium, comprising the steps of:
   (a) generating a search key having a first number of bits, wherein said search key comprises a virtual LAN identification (VLAN ID) and a media access control (MAC) address;
   (b) applying a universal hash function to said search key to generate a bucket ID having a second number of bits less than said first number of bits, by
      (i) segmenting said search key into a plurality of segments, each of said segments having an equal number of bits;
      (ii) multiplying each of said segments by a corresponding segment of a hash coefficient to create a series of products;
      (iii) summing said series of products to create a sum; and
      (iv) performing a MOD operation with said sum and a prime number to generate said bucket ID;
   (c) addressing a table stored in said computer readable medium using said bucket ID to obtain a pointer;
   (d) indexing a hash bucket using said pointer; and
   (e) comparing a first entry in said hash bucket to said search key to determine whether said first entry matches said search key.

2. A computer assisted method of locating an entry in a table as in claim 1 wherein said search key has 64 bits.

3. A computer assisted method of locating an entry in a table as in claim 1 wherein said bucket ID has 17 bits.

4. A computer assisted method of locating an entry in a table as in claim 1 wherein said prime number has the form $2^P-1$, where P is an integer and $2^P-1$ equals the number of hash buckets comprising said table.

5. A computer assisted method of locating an entry in a table as in claim 1 wherein said hash bucket comprises a maximum of four entries.

6. A computer assisted method for configuring a media access control (MAC) address table for a node of a communication network, comprising the steps of:

receiving at said node a frame of information, said frame including a MAC address;

generating a first value including said MAC address;

applying a universal hash function to said first value to generate a second value by (i) segmenting said first value into a plurality of segments, each of said segments having an equal number of bits, (ii) multiplying each of said segments by a corresponding segment of a hash coefficient to create a series of products, (iii) summing said series of products to create a sum, and (iv) performing a MOD operation with said sum and a prime number to generate said second value, and addressing a table using said second value to obtain a pointer; and storing said MAC address in a MAC address table at a storage location indicated by said pointer.

7. A computer assisted method of configuring a MAC address table as in claim 6 wherein said first value further includes a virtual LAN identifier (VLAN ID).

8. A computer assisted method of configuring a MAC address table as in claim 7 wherein said VLAN ID is obtained from said frame.

9. A computer assisted method of configuring a media access control (MAC) address table for a node of a communication network, said MAC address table having a number of hash buckets, each of said hash buckets having one or more entries, the method comprising the steps of:

receiving at said node a frame of information including a MAC address, said MAC address being different from each of said entries; and storing said MAC address as an entry in one of said hash buckets according to a universal hash function so long as a hash bucket overflow is not created by:
   (i) applying said universal hash function to said MAC address to generate a bucket value,
   (ii) addressing a table using said bucket value,
   (iii) retrieving a pointer from said table at a storage location determined by said step of addressing,
   (iv) indexing a corresponding one of said hash buckets using said pointer and determining the number of entries in said corresponding hash bucket, and
   (v) storing said MAC address as a new entry in said corresponding hash bucket if said number of entries is less than a threshold value;

otherwise generating a new MAC address table based on a new hash function, selected so that no hash bucket overflows will result when said MAC address is stored in said new MAC address table.

10. A computer assisted method of configuring a MAC address table as in claim 9 wherein said threshold value is four.

11. A computer assisted method of configuring a MAC address table as in claim 9 wherein generating said new MAC address table comprises the steps of:

selecting a new hash multiplier value;

generating a new hash function based on said hash multiplier value;

testing said new hash function by computing new bucket identifiers for each entry in said MAC address table using said new hash function and determining whether said new hash function will create any new hash buckets with a number of entries greater than said threshold; and generating said new MAC address table based on said new hash function so long as no new hash buckets will have a number of entries greater than said threshold, otherwise repeating said steps of selecting, generating and testing until an appropriate hash function is found.

12. A table search unit, comprising:

means for generating a search key having a first number of bits;

means for applying a universal hash function to said search key to generate a bucket ID having a second number of bits less than said first number of bits, said means for applying a universal hash function including: (i) means for segmenting said search key into a plurality of segments, (ii) means for multiplying each of said segments by a corresponding segment of a hash coefficient to create a series of products, (iii) means for summing said products to create a sum, and (iv) means for performing a MOD operation with said sum and a prime number to generate said bucket ID;

means for addressing a table stored in a computer readable medium using said bucket ID to obtain a pointer;

means for indexing a hash bucket using said pointer; and means for comparing a first entry in said hash bucket to said search key to determine whether said first entry matches said search key.

13. A communication node, comprising:

means for receiving a frame of information including a MAC address;

means for generating a first value including a MAC address;

means for applying a universal hash function to said first value to generate a search value;

means for storing said MAC address at a storage location corresponding to said search value, said means for storing including means for addressing a table using said search value to obtain a pointer, and means for storing said MAC address in a MAC address table at said storage location, said storage location being indicated by said pointer.

* * * * *